July 24, 1923.
L. J. GOULD
1,462,936
MEANS FOR UTILIZING POWER OF AUTOMOBILES
Filed Dec. 6, 1922  3 Sheets-Sheet 1
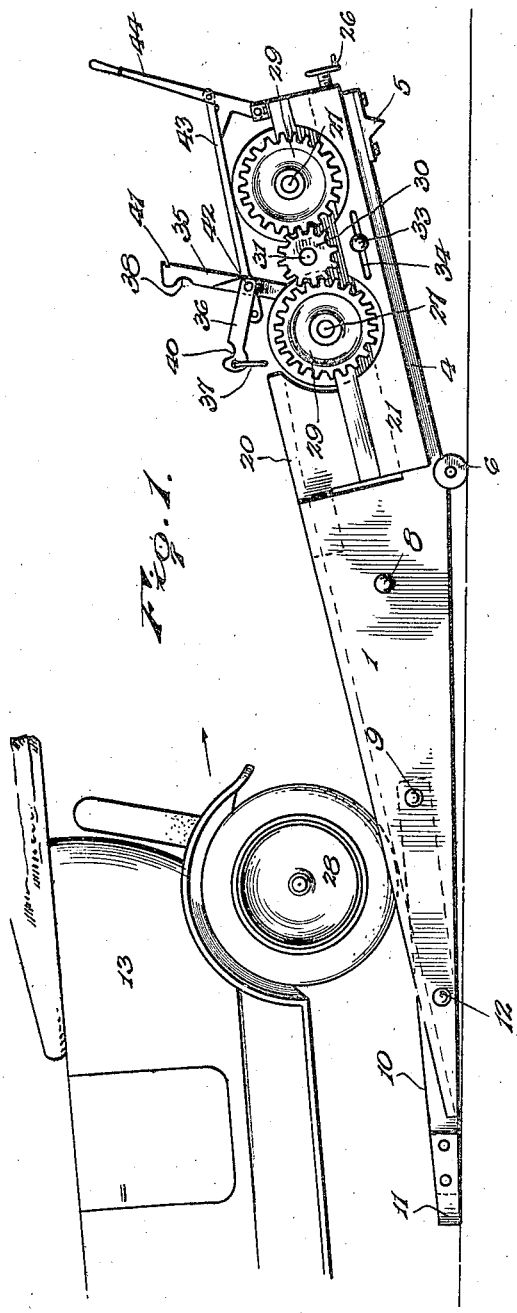
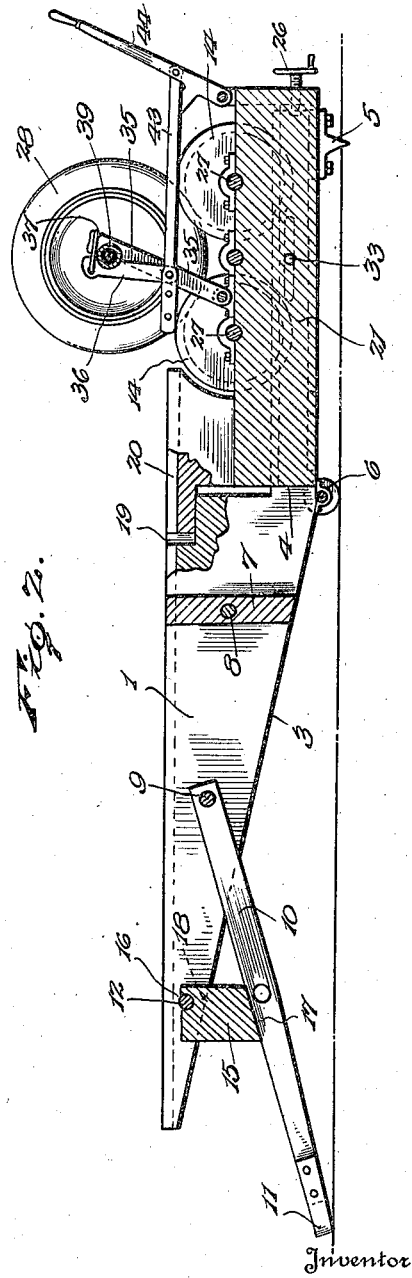
Inventor
*Loran J. Gould.*
By *Lacey & Lacey,* Attorneys

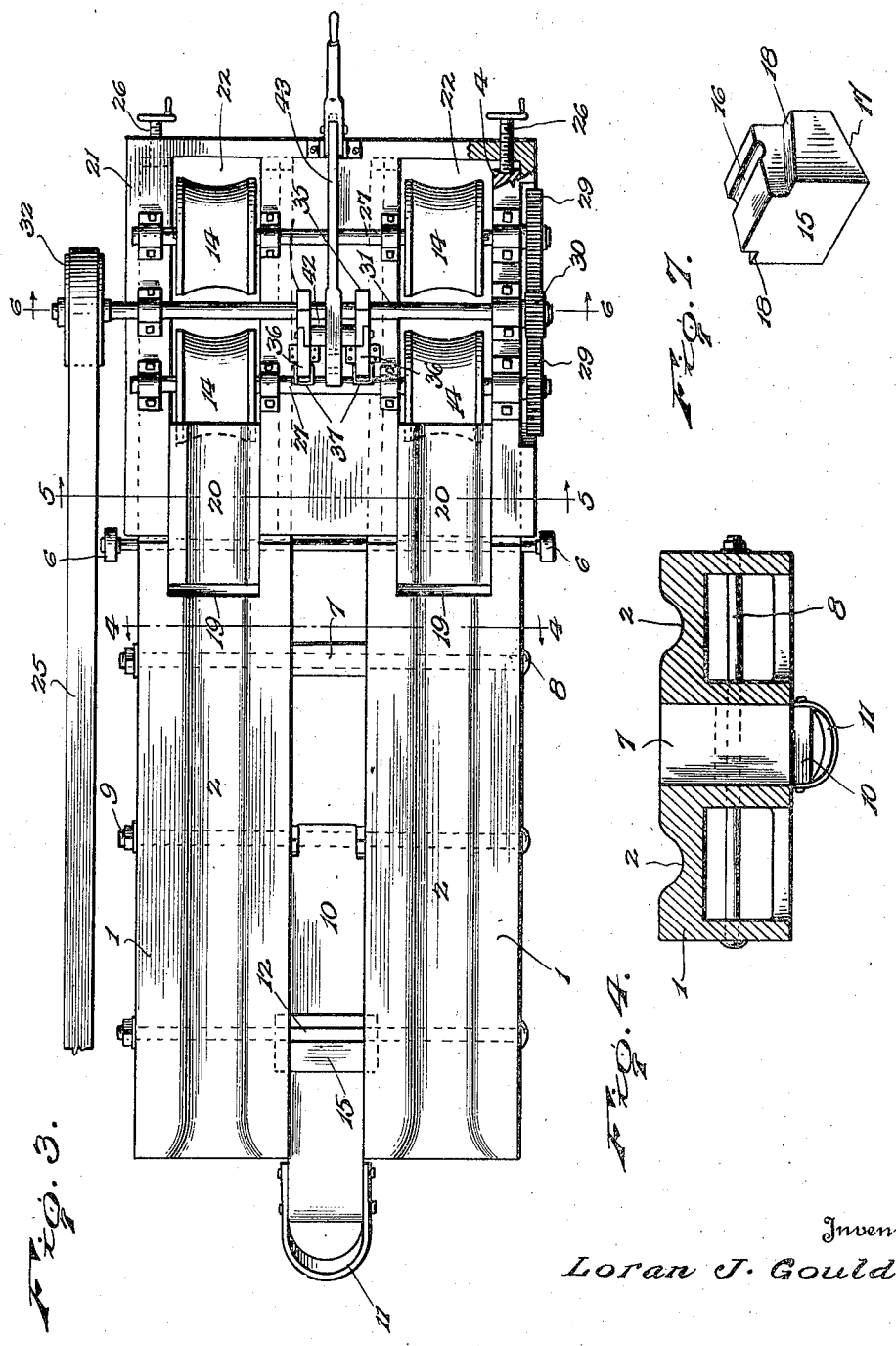

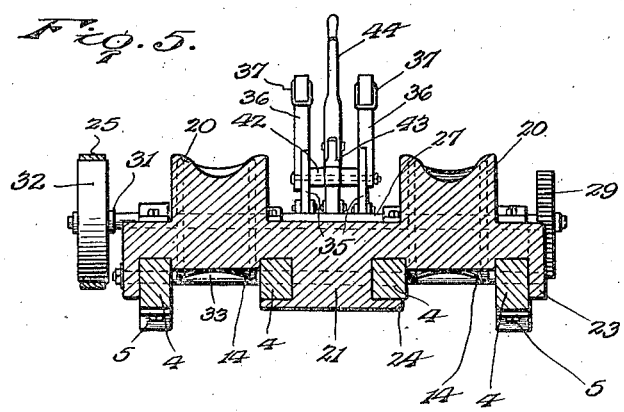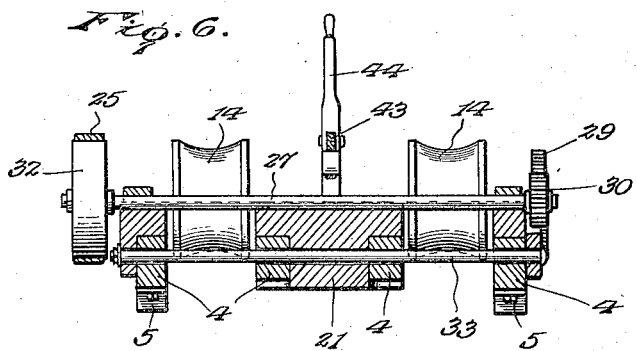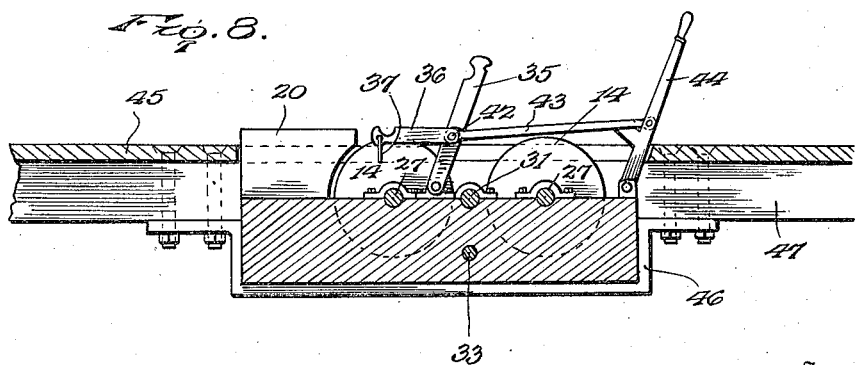

Patented July 24, 1923.

1,462,936

UNITED STATES PATENT OFFICE.

LORAN J. GOULD, OF ACME, WASHINGTON.

MEANS FOR UTILIZING POWER OF AUTOMOBILES.

Application filed December 6, 1922. Serial No. 605,281.

*To all whom it may concern:*

Be it known that I, LORAN J. GOULD, a citizen of the United States, residing at Acme, in the county of Whatcom and State of Washington, have invented certain new and useful Improvements in Means for Utilizing Power of Automobiles, of which the following is a specification.

This invention has for its object the provision of a simple and efficient apparatus by the use of which the power generated in the engine of an automobile may be advantageously applied to any machinery which is to be driven. The invention seeks to provide a mechanism which may be employed successfully upon a farm or in other outdoor situations and also within a garage or other working establishment. The invention seeks to provide an apparatus which may be readily secured firmly in the position in which it is to be used, and further seeks to provide means whereby the automobile will be held against travel when its motor is being utilized for driving machinery, and also to provide means whereby the automobile may be given an initial impulse to be withdrawn from the apparatus. The invention is illustrated in the accompanying drawings and will be hereinafter first fully described and then more particularly pointed out in the appended claims.

In the drawings:—

Figure 1 is a side elevation of my apparatus showing the same arranged to permit an automobile to be driven into working position thereon;

Fig. 2 is a central longitudinal section showing the device in the position assumed when it is at work;

Fig. 3 is a plan view of the apparatus in the position shown in Fig. 2;

Fig. 4 is a transverse section on the line 4—4 of Fig. 3;

Fig. 5 is a transverse section on the line 5—5 of Fig. 3;

Fig. 6 is a transverse section on the line 6—6 of Fig. 3;

Fig. 7 is a detail perspective view of a chock block which is employed, and

Fig. 8 is a longitudinal section showing the device as arranged for use within a factory or other establishment.

In carrying out my invention, I employ parallel runways 1 which may consist of substantial bars or beams having longitudinal grooves 2 in their upper surfaces and having their lower sides inclined or obliquely disposed relative to their upper sides, as shown at 3. At their rear ends, the beams or runways are provided with extensions 4 which project longitudinally from their lower corners, and on the under sides of these extensions at the rear ends thereof, I provide spurs 5 of any convenient form which are adapted to enter the ground and thereby aid in holding the device steady while it is being used. At the front ends of the extensions 4, I provide small wheels 6 which permit the device to rock easily from the position shown in Fig. 1 to that shown in Fig. 2 and also facilitate its movement from point to point. Adjacent their rear ends, a brace block 7 is disposed between the runways, and this brace block is secured in place by a long bolt 8 inserted through the same and through both side bars or runways. Intermediate the ends of the runways, a bolt 9 is inserted transversely through them, and upon this bolt is pivotally mounted a tongue 10 which may project forwardly beyond the runways and is equipped with a handle 11 whereby it may be easily held when it is desired to move the device to a place of use. This handle is preferably in the form of a loop or eye so that it may be utilized as a means for suspending the device upon any convenient support when it is not in use. Normally, the tongue 10 will project forwardly between the runways and beyond the tapered ends thereof and will be held fixedly in such position by a bolt 12 which is inserted through the tongue and through the runways, as clearly shown in Fig. 1. When the device is to be used, it is placed upon the ground in the position shown in Fig. 1, so that the upper surfaces of the runways will be inclined and the lower surfaces of the same will be close to or resting upon the ground, the tongue bearing at its free end upon the ground so that the device will be supported by the end of the tongues or ends of the runways and the rollers 6, as clearly shown. The automobile, indicated at 13, is then backed through the grooves 2 of the runways and will be thereby guided onto grooved pulleys 14 at the rear end of the apparatus and which will be presently more fully described. When the automobile has reached the point where its rear wheels will be resting upon the pulleys 14, the weight of the vehicle will be borne principally by the rear end of the apparatus which will thereupon rock about the wheels 6 and assume the position shown in Fig. 2. The bolt 12 is then withdrawn and a chock block 15 is brought into use to aid in holding the device steady. When the bolt 12 is withdrawn, the handle 10 will, of course, drop to the position shown in Fig. 2. The chock block 15 is then engaged over the tongue and under the runways and the bolt 12 is re-inserted through the runways and through a groove 16 in the top of the chock block, thereby effectually holding the said block against movement and binding the same between the handle and the runways. The bottom of the chock block 17 is disposed obliquely, relative to its sides, and the top of the block is of less width than the bottom thereof, thereby providing shoulders 18 upon its sides which are adapted to bear against the under sides or edges of the runways, as will be readily understood, the said shoulders converging toward the obliquely disposed bottom 17. It will be readily seen that the converging arrangement of the shoulders 18 and the bottom 17 produces wedge-like members which will lock the handle and the runways in the position shown in Fig. 2 so that the device will be held in a horizontal position while the motor vehicle is at work. The liability of the motor vehicle gravitating from the apparatus is thereby overcome or minimized.

The runways are recessed at their rear ends, as shown at 19, and these recesses receive the front ends of supplemental or extension runways 20 which are formed on or carried by a platform member 21. The supplemental runways 20 are, of course, longitudinally grooved in their upper surfaces so that they will aline with the grooves 2 of the main runways and will lie flush therewith, as clearly shown in Fig. 2. The platform member 21 is properly formed or built up to fit slidably upon the extensions 4 of the runways and adjacent its sides it is constructed with longitudinal openings or chambers 22 in which the grooved pulleys 14 are accommodated. As shown most clearly in Figs. 5 and 6, the platform member 21 is provided with depending side members 23 and lateral flanges 24 whereby it will be held against displacement upon the extensions 4 but may slide readily longitudinally of the same. This longitudinal sliding movement provides for a tightening of the belt 25 when necessary and, to effect the said movement, I provide adjusting screws 26 in the rear transverse portion of the platform member, the front ends of the said screws bearing against the rear ends of the side extensions 4. It will thus be readily seen that rotation of the screws will effect relative longitudinal movement of the platform member so that the proper tension upon the belt 25 may be maintained.

The grooved pulleys 14, which have been previously mentioned, are fixed upon shafts 27 disposed transversely upon the platform member 21 and mounted in suitable bearings thereon. The rollers are provided in pairs, each pair being alined longitudinally with one of the supplemental runways 20 so that the rear wheels of the automobile in the working position will be supported each by one pair of pulleys 14 with the axle of the automobile in a vertical plane disposed between the shafts 27, as shown at 28 in Fig. 2. Gears 29 are secured upon the shafts 27 at one end thereof and mesh with an intermediate gear 30 upon the end of the countershaft 31 which is mounted in suitable bearings upon the platform member and projects beyond one side of the same where it is equipped with a driving pulley 32, around which the belt 25 is trained. It will now be readily understood that, if the engine of the automobile be started, the rear wheels 28 of the same will be rotated in the usual manner, but instead of rolling upon the ground they will be in contact with and will transmit their motion to the rotatable pulleys 14 which will thereupon be set in motion and rotate the shafts 27. From the shafts 27, the motion will be transmitted through the gears 29 and 30 to the shaft 31 and thence through the pulley 32 to the belt 25 which may be carried to any desired point and operatively connected with any machinery which is to be driven. It will, of course, be readily understood that the dimensions of the gears 29 and 30 may be varied at will so as to obtain any desired ratio and thereby adjust the apparatus for speed or power as circumstances may demand. It will also be understood that a belt and pulleys may be substituted for the gears 29 and 30, if preferred.

To counteract any possible tendency of the parts of the platform member and the extensions 4 to separate, a long bolt 33 is inserted through these members, as clearly shown. The parts will thus be held in their proper transverse relation, and to accommodate the longitudinal movement of the platform member when such movement is necessary, the sides of said platform member are provided with longitudinal slots 34 in which the ends of the bolt are received.

To prevent dislodgment of the automobile while it is at work, I provide the axle-gripping members 35 and 36 which are adapted to clamp the rear axle of the automobile and be held in clamping engagement therewith by latches 37 which are adapted to engage around the free ends of the gripping members and thereby hold them together. One gripping member 35 is in the form of a lever or rocking arm pivoted upon the platform member 21 and provided with a notch 38 in its front edge which is adapted to receive the rear axle 39 of the automobile when the automobile is backed onto the platform, as will be readily understood. The gripping member 36 is pivoted upon the member 35 and is provided with a mating groove 40 in its rear edge so that, after the axle 39 has been received in the groove or notch 38, the member 36 may be swung rearwardly to the position shown in Fig. 2, whereby the axle will be encircled. The latch 37 is then engaged around the ends of the two gripping members, as shown in Fig. 2, so that the axle cannot be accidentally released. It will be noted that the latch 37 is in the form of a loop pivotally mounted in the end of the gripping member 36 and adapted to swing over and around the end of the member 35 to be received within a notch 41 in the rear edge thereof. The gripping members are preferably provided in duplicate so that the axle will be gripped at opposite sides of its center, and the pivot 42 which mounts the members 36 upon the respective members 35 is extended between the members and is engaged through an opening provided therefor in a link 43 which extends rearwardly over the platform and has its rear end pivoted to a hand lever 44 which is mounted upon the platform at the rear end of the same. By shifting the lever 44, of course, the position of the gripping members may be changed at will. When the device is set to receive an automobile, the gripping members are arranged, as shown in Fig. 1, so that the rear axle 39 of the vehicle will pass into the notches 38. The gripping members 36 are then swung into engagement with the axle and the latches 37 closed, after which the tongue 10 is shifted from the position shown in Fig. 1 to the position shown in Fig. 2 and the apparatus is ready for use. When the power of the automobile engine is no longer to be utilized, the tongue 10 is restored to the position shown in Fig. 1 so that the apparatus will assume the relatively inclined position shown in said figure. The latches 37 are then opened and the lever 44 shoved forward, thereby giving an impulse through the rear axle 39 to the vehicle which will cause it to gravitate down the inclined runways 20 and 2 so as to clear the same.

As thus far described, the apparatus is adapted more particularly for use outdoors, as upon a farm for driving a threshing machine or other apparatus. If it be desired to utilize the apparatus within a garage or other workroom, the runways and the platform member are separated. A pit is provided in the floor 45 of the workroom and the platform member is placed in this pit so that the bases of the grooves in the runways 20 will be flush with the surface of the floor, as will be readily understood upon reference to Fig. 8. The platform member may rest upon brackets 46 secured to the under sides of the joists 47, or the pit or chamber in which the platform is to be supported may be provided in any other desired or convenient manner. The automobile will be backed over and through the runways 20 onto the pulleys 14 and the apparatus will operate in all respects as in the previously described arrangement.

My apparatus is obviously simple and compact in the construction and arrangement of its parts, is strong and durable, may be readily transported from place to place, and, when in use, will operate steadily and efficiently.

Having thus described the invention, what is claimed as new is:

1. In an apparatus for the purpose set forth, the combination of parallel spaced runways, means carried by the rear ends of the runways for transmitting motion, a tongue pivotally mounted between the runways and adapted to be secured fixedly thereto or to depend therefrom whereby to support the runways in an elevated position, and a chock block engageable between the tongue and the runways whereby to lock the runways in the elevated position.

2. In an apparatus for the purpose set forth, the combination of a pair of parallel spaced runways, said runways having their upper and lower sides converging toward their front ends, means supported by the rear ends of the runways for transmitting motion, a tongue pivotally fitted between the runways, a bolt adapted to secure the tongue and the runways in fixed position, and a chock block having a transverse groove in its top to engage said bolt when the tongue is free of the same and provided on its sides with inclined shoulders to engage the under sides of the runways and having its bottom converging toward its shoulders whereby to rest upon the upper side of the tongue and effect wedging engagement between the tongue and the runways.

3. In an apparatus for the purpose set forth, the combination of a pair of parallel runways, longitudinal extensions projecting from the rear ends of said runways, a platform member slidably mounted upon said extensions, supplemental runways on said platform adapted to aline with and slidably engage the first-mentioned runways, means for adjusting the platform longitudinally of the said extensions, and means carried on the platform for transmitting motion.

4. In an apparatus for the purpose set forth, the combination of a platform, means mounted on the platform for supporting an automobile and receiving and transmitting motion therefrom, co-operating gripping members mounted on the platform and adapted to encircle the rear axle of an automobile, and means for swinging said gripping members forwardly whereby to release the automobile from the motion-receiving and transmitting means.

5. In an apparatus for the purpose set forth, the combination of a platform, means on the platform for supporting an automobile and receiving and transmitting motion therefrom, a rocking arm mounted upon the platform and adapted to bear against the rear axle of an automobile, a mating arm mounted on the first-mentioned arm and adapted to engage the axle of the automobile, a latch adapted to lock the said arms together about the axle of the automobile, a lever mounted on the platform at the rear end of the same, and a link connecting said lever with the said rocking members.

In testimony whereof I affix my signature.

LORAN J. GOULD. [L.S.]